(12) United States Patent
Xie et al.

(10) Patent No.: US 8,443,482 B2
(45) Date of Patent: May 21, 2013

(54) WINDSHIELD WIPERS AND METHODS FOR PRODUCING WINDSHIELD WIPER MATERIALS

(75) Inventors: Tao Xie, Troy, MI (US); Xingcheng Xiao, Troy, MI (US); Hamid G. Kia, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 297 days.

(21) Appl. No.: 12/833,309

(22) Filed: Jul. 9, 2010

(65) Prior Publication Data

US 2012/0010339 A1 Jan. 12, 2012

(51) Int. Cl.
*B60S 1/38* (2006.01)
*C08K 3/04* (2006.01)
*C08K 7/00* (2006.01)

(52) U.S. Cl.
USPC ..................... 15/250.001; 524/574; 524/588

(58) Field of Classification Search
None
See application file for complete search history.

(56) References Cited

U.S. PATENT DOCUMENTS

| 2006/0112512 A1* | 6/2006 | McNeil ....................... 15/250.48 |
| 2010/0125113 A1* | 5/2010 | Xiao et al. ..................... 523/468 |
| 2010/0147188 A1* | 6/2010 | Mamak et al. ............. 106/31.13 |

OTHER PUBLICATIONS

Wikipedia, "Graphene,", 2012, one page.*

* cited by examiner

*Primary Examiner* — Robert Sellers
(74) *Attorney, Agent, or Firm* — Parks IP Law LLC

(57) ABSTRACT

Wiper blade materials and methods for forming the same. The wiper blade materials are graphene-polymer composites that have a low coefficient of friction. In forming the graphene-polymer composites, a relatively small amount of graphene filler is well-dispersed within the polymer and the graphene filler and the polymer favorably interact with one another.

14 Claims, 2 Drawing Sheets

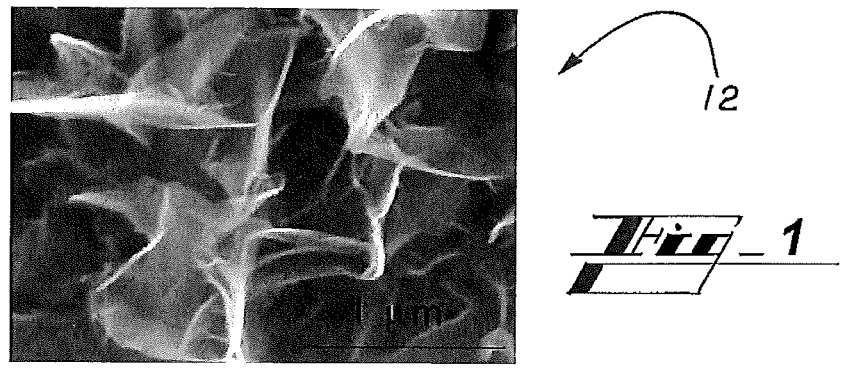
Fig_1
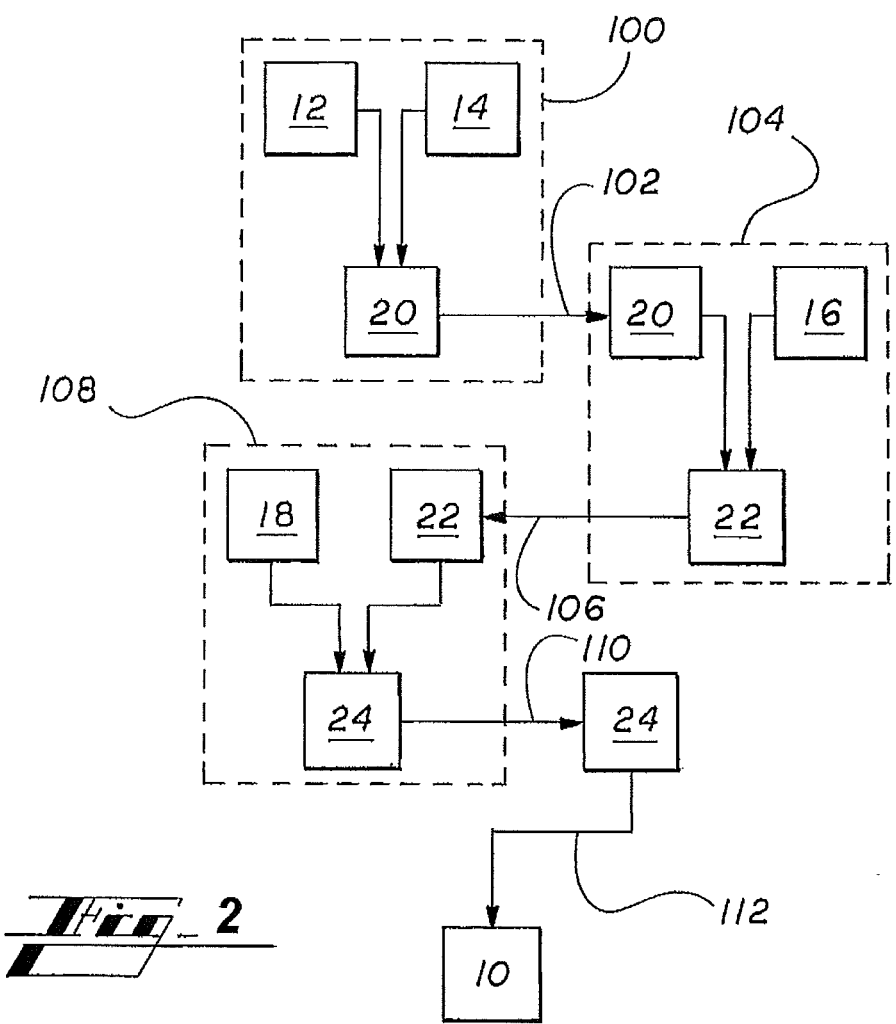
Fig_2

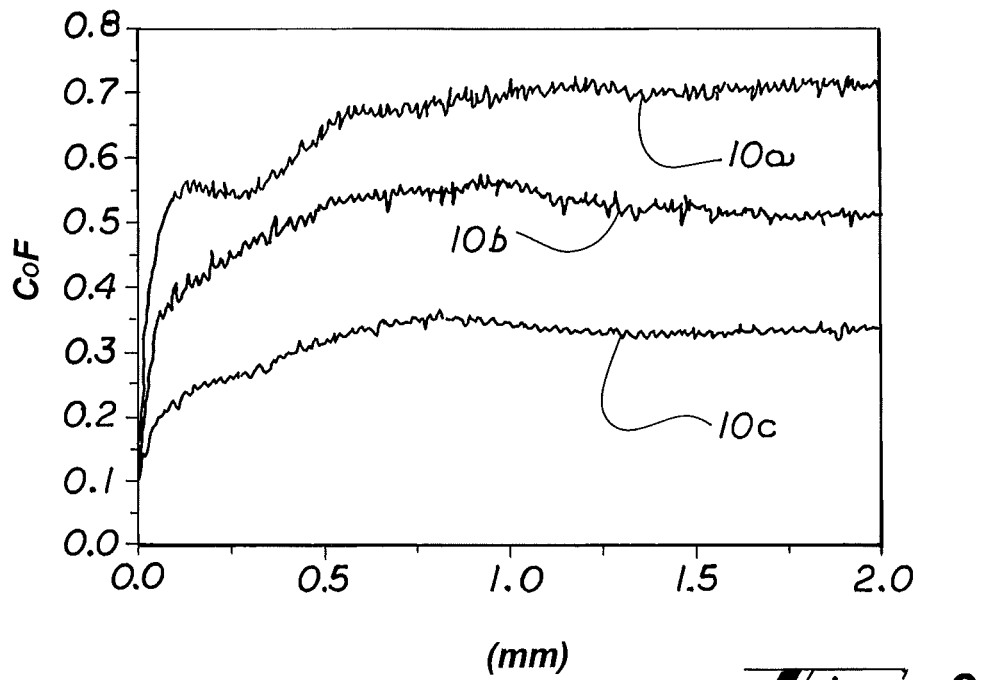
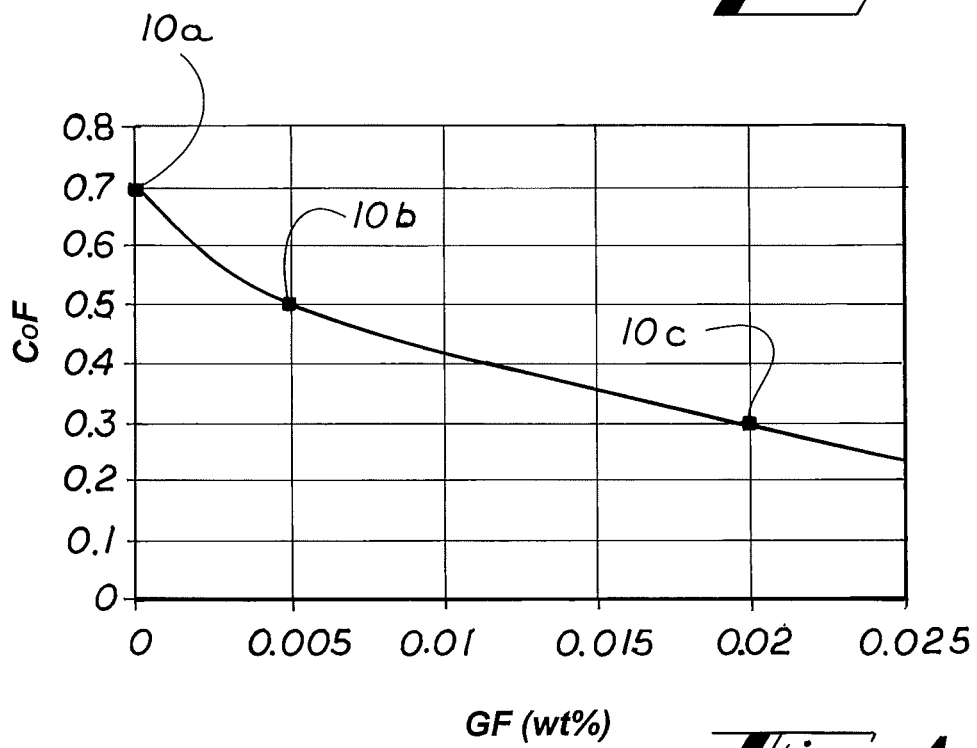

WINDSHIELD WIPERS AND METHODS FOR PRODUCING WINDSHIELD WIPER MATERIALS

TECHNICAL FIELD

The technical field is generally materials and method for producing materials with a low coefficient of friction and, more specifically, materials and methods for producing materials for windshield wipers.

BACKGROUND

A wiper blade material that has a low coefficient of friction is beneficial, for example, so that the size and power of the motor that drives the wiper can be reduced. Additives or fillers have been used to produce materials having a coefficient of friction that is reduced as compared to the coefficient of friction of the material without the fillers.

One problem associated with currently used filler is that, to reduce the coefficient of friction of the material to where the material is useful for use as a windshield wiper, a relatively large amount of filler is used. Because the filler in the bulk of the rubber increases the stiffness of the rubber, the durability and flexibility of the wiper blade is reduced.

Another problem associated with currently used filler is that the coefficient of friction is not maximally reduced by the filler since the filler is not well dispersed in the rubber polymer. For example, fillers that are mechanically blended into a rubber polymer are not well dispersed due to the high viscosity of the rubber polymer.

Still another problem with currently used filler is that the filler does not favorably interact with the rubber polymer matrix. As such, the mechanical properties of the rubber polymer are compromised or the rubber polymer composite has undesirable stiffness.

SUMMARY

The exemplary embodiments provide wiper blade materials that achieve a low coefficient of friction with a relatively small amount of filler, a method for dispersing filler throughout a polymer composite, and a method for providing favorable interaction between a polymer and filler.

According to one exemplary embodiment, a wiper blade is formed from a graphene-polymer composite. The graphene-polymer composite includes a graphene filler dispersed in a polymer. According to certain embodiments, the graphene filler includes graphene platelets and the weight fraction of the graphene filler is less than 0.1 percent of the graphene-polymer composite. According to certain embodiments, the weight fraction of the graphene filler is in the range of approximately 0.005 to 0.2 percent of the graphene-polymer composite. Exemplary graphene platelets include nanolayered graphene, few layered graphene, and graphite nanoplatelets. Exemplary polymers include silicon rubber, ethylene propylene diene monomer, and silyl modified polymer.

According to another exemplary embodiment, a method for forming a wiper blade includes combining graphene filler and amine to form a first mixture and dispersing the graphene filler in the amine. The graphene filler includes graphene platelets. In certain embodiments, the graphine filler is dispersed in the amine using ultrasonification. In certain embodiments, the amine is allylamine.

According to some exemplary embodiments, the graphene filler is combined in an amount having a weight fraction that is less than 0.1 percent of a graphene-polymer composite of which the wiper blade is formed. In certain of these embodiments, the graphene filler is combined in an amount having a weight fraction that is approximately in the range of 0.005 to 0.02 percent of a graphene-polymer composite of which the wiper blade is formed.

The exemplary method further includes (1) combining the first mixture and a curing agent to produce a second mixture, (2) dispersing the graphene filler in the amine and curing agent of the second mixture using ultrasonification, (3) combining the second mixture and a base resin to produce a third mixture, (4) dispersing the graphene filler in the amine, curing agent, and base resin of the third mixture using ultrasonification, and (5) curing the third mixture in the form of a wiper blade.

The foregoing has broadly outlined some of the aspects and features of the various embodiments, which should be construed to be merely illustrative of various potential applications. Other beneficial results can be obtained by applying the disclosed information in a different manner or by combining various aspects of the disclosed embodiments. Other aspects and a more comprehensive understanding may be obtained by referring to the detailed description of the exemplary embodiments taken in conjunction with the accompanying drawings, in addition to the scope defined by the claims.

DESCRIPTION OF THE DRAWINGS

FIG. 1 is a characterization of graphene on a 1 micrometer scale as would be produced by a chemical vapor deposition.

FIG. 2 is a block diagram of a method for forming a graphene-polymer composite material.

FIG. 3 is a graphical illustration of scratch test results that illustrate the coefficient of friction of graphene-polymer composites with different amounts of graphene filler.

FIG. 4 is a graphical illustration of coefficient of friction vs. amount of graphene filler according to the results the scratch test results illustrated in FIG. 3.

DETAILED DESCRIPTION

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are know to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art to.

The exemplary embodiments provide a low-friction composite material including a polymer and a filler. Exemplary polymers for windshield wiper applications include rubber polymers such as silicon rubber, ethylene propylene diene monomer (EPDM) polymer, silyl modified polymer (SMP), and the like. It should be understood that other polymers are may be used.

Exemplary embodiments are described for graphene fillers. It should be understood that fillers with similar suitable properties and characteristics may provide the functionality described herein as well. Generally described, single-layered graphene is a one-atom-thick substantially planar sheet of bonded carbon atoms that are densely packed in a honeycomb crystal lattice. As used herein, the term graphene is used to generally describe thinly-layered structures including one or more single-layered graphene sheets that are stacked together. Exemplary graphene fillers include graphene, nano-layered graphene (NLG), few layered graphene (FLG), graphite nanoplatelets (GNP), other nanolayered fillers, and the like. For reference, nanolayered graphene (NLG) is graphene that includes up to ten layers of single layer graphene, few layer graphene (FLG) is graphene that includes two to three layers of single layer graphene, and graphite nanoplatelet (GNP) is graphene that includes stacked layers of graphene. GNP is generally between about 1 and about 15 nanometers thick.

In general, each of the exemplary fillers has a platelet shape. The platelet shape is also described as a substantially planar shape. In some embodiments, as illustrated in FIG. 1, graphene has a structure that looks like wrinkled paper. The platelet shape can be contrasted, for example, with the tubular shape of carbon nanotubes and fullerenes.

To facilitate dispersion of graphene filler and to provide favorable interaction between graphene filler and the associated polymer, an amine is used in an exemplary process described in further detail below. Exemplary amines include allylamine, hexyl amine, Jeffamine, and the like.

Referring to FIG. 2, for purposes of illustration, an exemplary method for fabricating a graphene-polymer composite 10 from graphene filler 12, amine 14, curing agent 16, and a base resin 18 is described in detail. As an example, to form a NLG-silicon rubber composite, the graphene filler 12 is NLG filler, the amine 14 is allylamine, the curing agent 16 is silicon rubber curing agent, and the base resin 18 is base silicon resin.

At a first mixture step 100, a small amount of the graphene filler 12 is added to the amine 14 to provide a first mixture 20. The amount of graphene filler 12 is described in further detail below. The graphene filler 12 and the amine 14 have favorable non-covalent interactions (pi-HN interactions) since the amine group (HN) of the amine 14 favorably interacts with the pi electron on the surface of the graphene filler 12. The favorable interaction between the graphene filler 12 and the amine 14 facilitates dispersion of the graphene filler 12 and facilitates a strong interface between the graphene filler 12 and the polymer of the graphene-polymer composite 10. The interface is such that the introduction of the graphene filler 12 will not compromise the mechanical properties of the graphene-polymer composite 10.

At a first dispersion step 102, ultrasonification is applied to the first mixture 20. Ultrasonification well-disperses the graphene filler 12 in the low-viscosity amine 14 and facilitates chemical reactions between the graphene filler 12 and the amine 14. The platelet shape of the graphene filler 12 includes edges that are easier to modify chemically for enhanced dispersion and the small, platy dimensions and structure of the graphene filler 12 enable the filler to be well-dispersed in a low-viscosity mixture with a process such as ultrasonification. In addition, as described above, the favorable interaction between the graphene filler 12 and the amine 14 facilitates dispersion of the graphene filler 12 in the amine 14. Well-distributing the graphene filler 12 enables loading of the graphene filler 12 on the surface of the graphene-polymer composite 10. Loading the graphene filler 12 on the surface of the graphene-polymer composite 10 reduces the coefficient of friction between the surface and, for example, glass.

According to a second mixture step 104, the low-viscosity curing agent 16, which includes a vinyl group, is combined with to the first mixture 20 to get a second mixture 22. According to a second dispersion step 106, ultrasonification is applied to the second mixture 22. The graphene filler 12 is well-dispersed in the second mixture 22 since both the amine 14 and the curing agent 16 are low-viscosity substances.

According to a third mixing step 108, the base resin 18 is added to the second mixture 22 to get a third mixture 24. In the case where the amine 14 is allylamine, the allyl group of the amine 14 reacts with the base resin 18 to form covalent bonds. The covalent bonds provide a strong interface between the graphene filler 12 and the polymer of the graphene-polymer composite 10.

According to a third dispersion step 110, ultrasonification is applied to the third mixture 24. The graphene filler 12 is well-dispersed since the third mixture 24 is low viscosity. According to a curing step 112, the third mixture 24 is thermally cured to produce the graphene-polymer composite 10. For example, the third mixture 24 is thermally cured to form the graphene-polymer composite 10 in the form of a relatively low-coefficient component such as a windshield wiper.

The coefficient of friction of the graphene-polymer composite 10 as a function of the amount of graphene filler 12 is now discussed in further detail. For purpose of illustration, tests were performed that illustrate the relationship between the amount of graphene filler 12 and the coefficient of friction between the graphene-polymer composite 10 and glass. The amount of graphene filler 12 in the graphene-polymer composite 10 is commonly characterized as a percentage of volume, weight, or mass of the graphene-polymer composite 10. For purposes of illustration, the amount of graphene filler 12 is characterized in terms of percentage of weight (wt %) of the graphene-polymer composite 10.

FIG. 3 illustrates several scratch tests that were conducted using graphene-polymer composites 10a, 10b, 10c with various amounts of graphene fillers 12. In the illustrated tests, the graphene filler 12 used to make the grapheme-polymer composite 10 is NLG. Various amounts of the graphene filler 12 are used according to the exemplary method described herein to provide graphene-polymer composites 10a, 10b, 10c with different coefficient of friction CoF. In the illustrated test, the graphene-polymer composites 10 are NLG-silicon rubber composites. The graphene filler 12 (represented by "GF" in FIG. 4) is used in amounts of zero percent of weight (wt %), 0.005 percent of weight (wt %), and 0.02 percent of weight (wt %). The first graphene-polymer composite 10a includes zero graphene filler 12, the second graphene-polymer composite 10b includes 0.005 wt % of graphene filler 12, and the third graphene-polymer composite 10c includes 0.02 wt % of graphene filler 12.

The coefficient of friction CoF of each of the resulting graphene-polymer composites 10a, 10b, 10c on glass is determined using a scratch test. The scratch test protocol is a standard test in the wiper industry for testing friction coefficients. In general, the scratch test protocol includes pulling the graphene-polymer composite 10 over a distance D to determine the effect the associated amount of graphene filler 12 has on the friction characteristics of the graphene-polymer composite 10. In particular, a sample of the graphene-polymer composite 10 is placed on a slab of glass and a two hundred gram weight is applied to the sample of the graphene-polymer composite 10. The amount of force required to pull the graphene-polymer composite 10 across the glass (the "pulling force") is measured and recorded. The coefficient of friction CoF is then calculated by dividing the pulling force by the normal force, which is a function of the two hundred gram weight.

Referring to FIGS. 3 and 4, the resulting coefficients of friction CoF and the relationship between the coefficient of friction CoF and the amount of graphene filler 12 (GF) are described. Steady state kinematic coefficient of friction CoF can be determined as the substantially constant CoF value measured after the sample has been pulled a certain distance D. The steady-state kinematic coefficient of friction CoF is approximately 0.7 for the graphene-polymer composite 10a with zero graphene filler 12, approximately 0.5 for the graphene-polymer composite 10b with 0.005 wt % graphene filler 12, and approximately 0.3 for the graphene-polymer composite 10c with 0.02 wt % graphene filler 12. As such, 0.005 wt % of graphene filler 12 reduces the coefficient of friction, relative to zero graphene filler 12, by a factor of about 1.4 and 0.02 wt % of graphene filler 12 reduces the coefficient of friction, relative to zero graphene filler 12, by a factor of about 2.3. In general, the graphene filler 12 weight fraction in a range from about 0.01% to about 5% can reduce the coefficient of friction CoF of the associated graphene-polymer composite 10 by between about 2 fold and about 100 fold.

The above-described embodiments are merely exemplary illustrations of implementations that are set forth for a clear understanding of principles. Variations, modifications, and combinations associated with the above-described embodiments may be made without departing from the scope of the claims. All such variations, modifications, and combinations are included herein by the scope of this disclosure and the following claims.

What is claimed is:

1. A method for forming a wiper blade, the method comprising:
   combining graphene filler and amine yielding a first mixture, the graphene filler including graphene platelets;
   combining the first mixture and a curing agent yielding a second mixture;
   combining the second mixture and a base resin yielding a third mixture; and
   curing the third mixture yielding a graphene-polymer composite in the form of a wiper blade;
   wherein combining the graphene filler and the amine includes combining the graphene filler in an amount with a weight fraction that is in the range of about 0.005 to less than 0.1 percent of the graphene-polymer composite of which the wiper blade is formed; and
   wherein combining the graphene filler and the amine comprises dispersing the graphene filler in the amine using ultrasonification.

2. A method for forming a wiper blade, the method comprising:
   combining graphene filler and amine yielding a first mixture, the graphene filler including graphene platelets;
   combining the first mixture and a curing agent yielding a second mixture;
   combining the second mixture and a base resin yielding a third mixture; and
   curing the third mixture yielding a graphene-polymer composite in the form of a wiper blade;
   wherein combining the graphene filler and the amine includes combining the graphene filler in an amount with a weight fraction that is in the range of about 0.005 to less than 0.1 percent of the graphene-polymer composite of which the wiper blade is formed; and
   wherein the amine is allylamine.

3. A method for forming a wiper blade, the method comprising:
   combining graphene filler and amine yielding a first mixture, the graphene filler including graphene platelets;
   combining the first mixture and a curing agent yielding a second mixture;
   combining the second mixture and a base resin yielding a third mixture; and
   curing the third mixture yielding a graphene-polymer composite in the form of a wiper blade;
   wherein combining the graphene filler and the amine includes combining the graphene filler in an amount with a weight fraction that is in the range of about 0.005 to about 0.02 percent of a graphene-polymer composite of which the wiper blade is formed.

4. The method of claim 1, further comprising dispersing the graphene filler in the amine and curing agent of the second mixture using ultrasonification.

5. The method of claim 1, further comprising dispersing the graphene filler in the amine, curing agent, and base resin of the third mixture using ultrasonification.

6. A wiper blade formed according to a manufacturing process, the process comprising:
   combining graphene filler and amine yielding a first mixture, the graphene filler including graphene platelets;
   combining the first mixture and a curing agent yielding a second mixture;
   combining the second mixture and a base resin yielding a third mixture; and
   curing the third mixture yielding a graphene-polymer composite in the form of a wiper blade;
   wherein combining the graphene filler and the amine includes combining the graphene filler in an amount with a weight fraction that is in the range of about 0.005 to less than 0.1 percent of the graphene-polymer composite of which the wiper blade is formed; and
   wherein combining the graphene filler and the amine comprises dispersing the graphene filler in the amine using ultrasonification.

7. A wiper blade formed according to a manufacturing process, the process comprising:
   combining graphene filler and amine yielding a first mixture, the graphene filler including graphene platelets;
   combining the first mixture and a curing agent yielding a second mixture;
   combining the second mixture and a base resin yielding a third mixture; and
   curing the third mixture yielding a graphene-polymer composite in the form of a wiper blade;
   wherein combining the graphene filler and the amine includes combining the graphene filler in an amount with a weight fraction that is in the range of about 0.005 to less than 0.1 percent of the graphene-polymer composite of which the wiper blade is formed; and
   wherein the amine is allylamine.

8. A wiper blade formed according to a manufacturing process, the process comprising:
   combining graphene filler and amine yielding a first mixture, the graphene filler including graphene platelets;
   combining the first mixture and a curing agent yielding a second mixture;
   combining the second mixture and a base resin yielding a third mixture; and
   curing the third mixture yielding a graphene-polymer composite in the form of a wiper blade;
   wherein combining the graphene filler and the amine includes combining the graphene filler in an amount with a weight fraction that is in the range of about 0.005 to less than 0.1 percent of the graphene-polymer composite of which the wiper blade is formed; and wherein combining the graphene filler and the amine includes combining the graphene filler in an amount with a weight fraction that is in the range of about 0.005 and about 0.02 percent of a graphene-polymer composite of which the wiper blade is formed.

9. The method of claim 1, wherein the amine is allylamine.

10. The method of claim 1, wherein combining the graphene filler and the amine includes combining the graphene filler in an amount with a weight fraction that is in the range of about 0.005 to about 0.02 percent of a graphene-polymer composite of which the wiper blade is formed.

11. The method of claim 2, wherein combining the graphene filler and the amine includes combining the graphene filler in an amount with a weight fraction that is in the range of about 0.005 to about 0.02 percent of a graphene-polymer composite of which the wiper blade is formed.

12. The wiper blade of claim 6, wherein the amine is allylamine.

13. The wiper blade of claim 6, wherein combining the graphene filler and the amine includes combining the graphene filler in an amount with a weight fraction that is in the range of about 0.005 and about 0.02 percent of a graphene-polymer composite of which the wiper blade is formed.

14. The wiper blade of claim 7, wherein combining the graphene filler and the amine includes combining the graphene filler in an amount with a weight fraction that is in the range of about 0.005 and about 0.02 percent of a graphene-polymer composite of which the wiper blade is formed.

* * * * *